Feb. 21, 1928.
S. A. CRONE
1,659,992
SELF LOCKING PIN OR BOLT
Filed Sept. 17, 1925     2 Sheets-Sheet 1
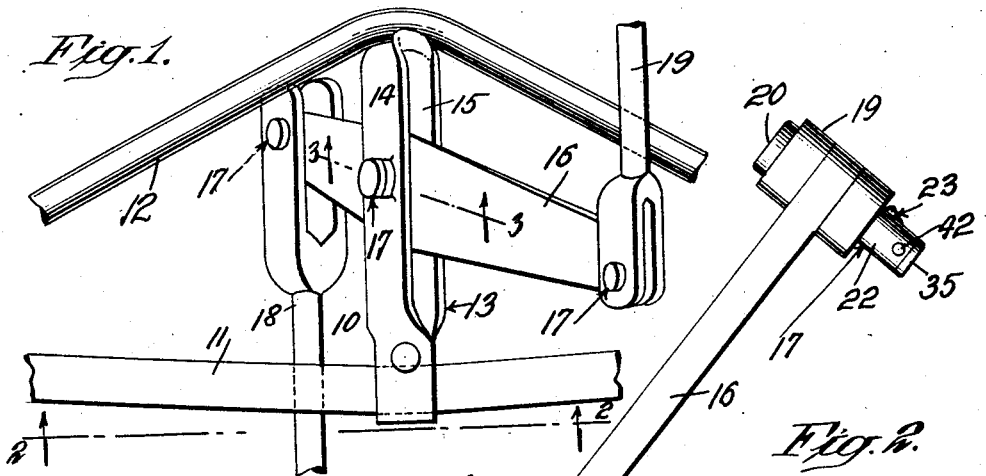
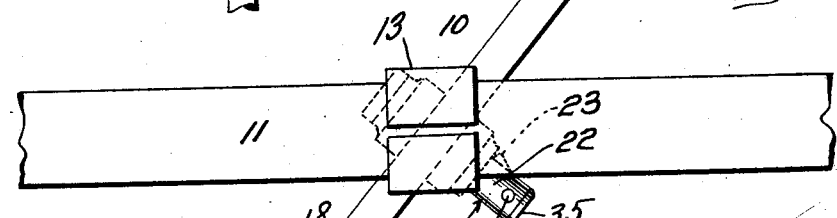
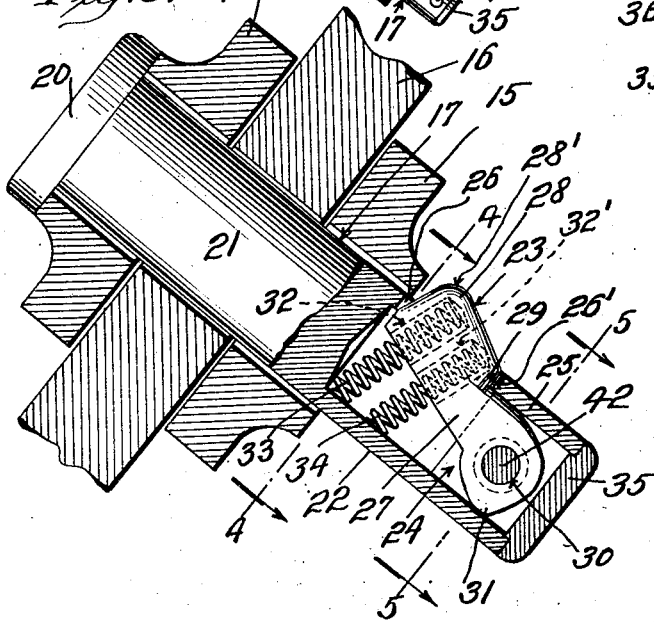
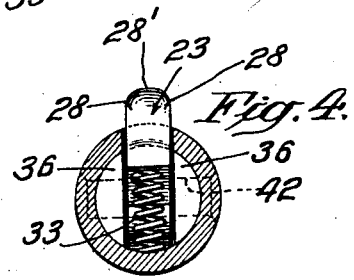
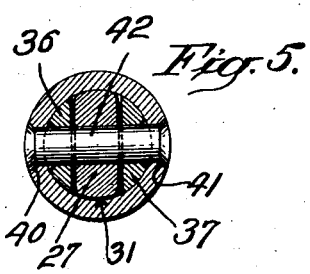
INVENTOR
SETH A. CRONE
BY
ATTORNEY

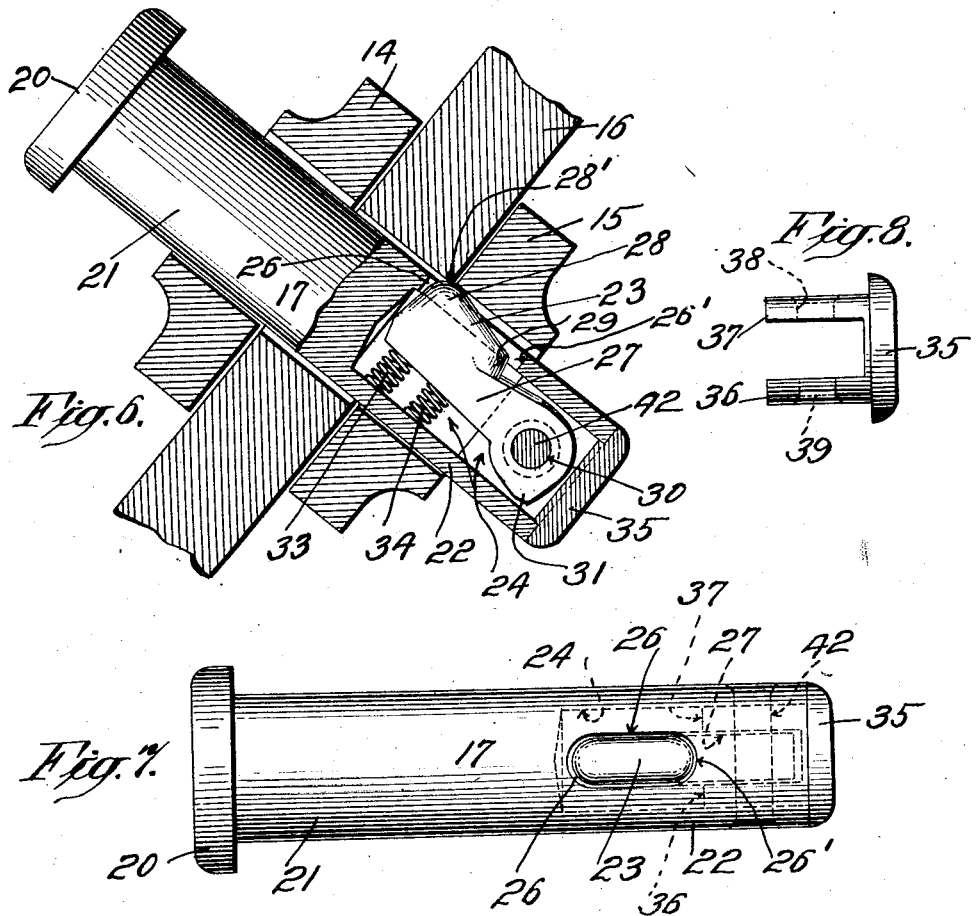

Patented Feb. 21, 1928.

1,659,992

UNITED STATES PATENT OFFICE.

SETH A. CRONE, OF EAST ORANGE, NEW JERSEY, ASSIGNOR TO BUFFALO BRAKE BEAM COMPANY, A CORPORATION OF NEW YORK.

SELF-LOCKING PIN OR BOLT.

Application filed September 17, 1925. Serial No. 56,906.

This invention relates to improvements in self-locking pins or bolts for railway brake beam levers and their connections, and like devices.

One of the objects of this invention is to produce a pin or bolt which will have greatly increased rigidity at the forward or insertion end, over other self-locking pins.

Another object of this invention is to produce a self-locking pin which will have increased weather-resisting properties and durability.

Another object of the invention is to provide a double mounting for the self-locking pawl, to the end that the pawl will be retained in operative position independently of its pivot pin, whereby even though the pivot pin fails to hold, the pawl will still be held in operative position.

Another object of the invention is to provide for the pawl a firm limiting-stop against outward movement.

Another object of the invention is to utilize in a self-locking pin construction of the character specified, a pawl having a projecting portion rounded at the opposite corners of its rear end to enable a more ready retraction of the bolt through a series of holes of varying diameters in railway brake beam levers and their connections.

Another object is to provide a pin construction in which an axial bore having an isolated opening of less length than the bore extending from said bore through the wall of the pin provides a pawl housing and maintains a continuous peripheral wall at the end of the pin, thereby greatly strengthening the construction and also enabling the enclosure of all mounting and actuating parts of the pawl, excepting the operating nose thereof.

Another object is to utilize at the forward or insertion end of the pin, a cap for the axial bore having mounting members adapted to fit within the bore and add further to the solidity and rigidity of the construction and at the same time to completely close the said insertion or forward end of said pin so as to make the pawl parts and springs weather proof, to prevent deterioration thereof due to weather and other causes, and to protect the same from the entrance of dust and dirt.

With these and other objects in view, the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawings, in which:—

Fig. 1 is a perspective view, partly broken away, of a truss brake beam including self-locking pins embodying my invention;

Fig. 2 is a section on the line 2—2 of Fig. 1, looking in the direction of the arrow;

Fig. 3 is a section on the line 3—3 of Fig. 1, looking in the direction of the arrow;

Fig. 4 is a cross-section on the line 4—4 of Fig. 3, looking in the direction of the arrow;

Fig. 5 is a similar section on the line 5—5 of Fig. 3, looking in the direction of the arrow;

Fig. 6 is a sectional view similar to Fig. 3 showing a pin or bolt partially withdrawn or retracted from registering bearing apertures in the lever and mounting members of a truss brake beam;

Fig. 7 is an elevation of a pin embodying my invention and,

Fig. 8 is an elevation of a cap and mounting connection for the pawl of my self-locking pin;

Referring now to these drawings, 10 indicates a portion of a truss brake-beam embodying a compression member 11, a tension member 12 and a strut 13 between the side members 14 and 15 of which a brake-lever 16 is mounted on a pin 17, said lever being also connected at opposite ends with reversely-extending connecting rods 18 and 19 respectively by means of similar pins 17. Each of said pins has a head 20, a shank 21 and an extension end-portion 22 arranged to project beyond the members connected by the shank and provided with a self-locking pawl 23.

In accordance with my present invention, the said extension end portion 22 is provided with an axial bore 24 of less diameter than the pin so as to leave a continuous peripheral wall 25 of suitable thickness about said axial bore, which wall is pierced by an aperture or window 26 completely surrounded by the peripheral wall 25, which is thus maintained in unweakened condition at the insertion end. As illustrated, the pierced aperture or window 26 is of a width substantially equal to the width of the pawl 23 and of a length much less than the length of the bore and extension portion so that a continuous and unbroken peripheral wall 25 of considerable length at the end of the pin will be provided.

The pawl 23 comprises a shank portion 27 of reduced width having at its outer free end an outwardly extending or projecting portion 28 of a length and width sufficient to completely close the said window 26 when moved into operative or locking position, an elbow 29 formed between the said shank and projecting portion on the outer edge being adapted to rest on the bottom or sill portion 26' and to provide a means for limiting the outward movement of the pawl.

The lower end of the shank portion of the pawl is preferably provided with a pivot bearing aperture 30 and also preferably has at said lower end a laterally extending toe 31, adapted when the pawl is mounted to abut against the inner wall of the bore 24 and to form a supplemental or secondary stop to limit the outward movement of the said pawl.

The pawl 23 is normally pressed outwardly to cause its outer surface or nose 28 to project through the said window 26. As illustrated, bores 32, 32', are provided in the rear face of the said pawl and coil springs 33 and 34 have their forward ends inserted in the said bores and their rear ends abutting against the wall of the bore 24. When so forced outwardly by the springs 33 and 34, the outward extension or nose of the pawl completely fills the window or aperture 26 so that the springs are completely enclosed and protected from the weather.

The open end of the bore is preferably closed by a cap 35 suitably fastened in place. It will be seen that when the pawl is so confined it cannot escape irrespective of its mounting and will perform its usual functions. In the preferred embodiment of my invention, however, I mount the pawl pivotally and fasten the cap by a single pin. Thus the cap is provided with a pair of inwardly extending filler strips 36 and 37, having apertures 38 and 39 adapted to register, when the cap is seated in place, with the bearing aperture 30 of the pawl and the said pawl is thus pivotally mounted and the cap is fastened in place by providing holes 40 and 41 in opposite portions of the peripheral walls 25 which register with the bearing apertures 30 and the filler strip apertures 38 and 39, then passing a pin 42 through such registering holes 38 and 39, 40 and 41 and through the bearing aperture 30 of the pawl and thereafter flattening the ends of said pin to retain the same in place.

In the preferred embodiment of my invention shown the projecting portion 28 of the pawl 23 has the corner 28' at the rear edge so rounded as to cause the upper edge portion to have substantially the shape of a segmental sphere or section of a ball which, during the retraction of the pin through a series of members which have holes of varying diameters, such as in the parts 14, 15 and 16 of a brake beam, will more readily slide along such uneven walls and will permit the pawl by a twisting or turning movement of the pin to be slid or moved over the edge of a contracted hole in one of such members, thus overcoming a serious objection to the use of this type of pin.

From the above it will be seen that I have produced a pin or bolt which will have greatly increased rigidity at the forward or insertion end; which will have increased weather resisting properties and durability; which will have a double mounting for the self-locking pawl so as to cause said pawl to be retained in operative position independently of its pivot whereby even though the pivot pin fails to hold the pawl will still be operative; also that I provide the pawl with a firm limiting stop against outward movement; furthermore that I utilize a pawl having a rounded projecting portion which will enable more ready retraction of the bolt through a series of holes of varying diameters in railway brake-beam levers and their connections or like devices; that I produce a pin construction in which an axial bore having an isolated opening of less length than the bore will provide a pawl housing and maintain a continuous peripheral wall which will greatly strengthen the construction and enable enclosure of all mounting and actuating parts of pawl, excepting the operating nose thereof; also that I have utilized at the forward or insertion end a cap having mounting members adapted to add further to the rigidity and solidity of the construction and at the same time to completely close the mouth of the bore and to make the pawl parts and springs weather proof, to prevent deterioration thereof and to protect the same from the entrance of dust and dirt.

Having described my invention, I claim:

1. A self locking pin for railway brake beam lever connections and the like, embodying a solid shank portion provided with a head and having at its opposite insertion end an extension portion provided with a dead-end axial bore to form a pawl housing, said housing having an aperture pierced through the wall thereof spaced from said insertion end of the pin, a pawl arranged within said housing and having a portion projecting through said aperture, a spring arranged within said housing for forcing said projecting portion through said aperture into operative position, said projecting portion being of a size and shape substantially filling said aperture when the pawl is in said operative position, and a cap for closing the end of said bore.

2. A self-locking pin embodying a shank portion having at its insertion end an axial bore to provide a pawl housing and an aperture pierced through the wall of said bore and spaced from said insertion end of the pin, a pawl arranged within said axial bore and having a portion projecting through said aperture a cap for closing the end of said bore and means for simultaneously mounting said pawl and fastening said cap.

3. A self-locking pin embodying a shank portion having at its insertion end an axial bore to provide a pawl housing and an aperture pierced through the wall of said housing and spaced from said end of the pin; a pawl arranged in said housing and comprising a reduced shank portion provided at its lower end with a bearing aperture and having a projecting portion provided with limiting means abutting against the wall of said housing aperture, a spring within said bore for forcing said projecting portion through said housing aperture, a cap having inwardly extending projections provided with apertures adapted to register with the bearing aperture in the pawl, and a pivot pin extending through the walls of said bore and through said aperture in the cap projections and in the shank of the pawl.

In witness whereof, I have signed my name to the foregoing specification.

SETH A. CRONE.